United States Patent [19]

Russ et al.

[11] Patent Number: 4,696,432
[45] Date of Patent: Sep. 29, 1987

[54] FORAGE HARVESTER BLOWER

[75] Inventors: Roger A. Russ; John J. Hennen, both of Ottumwa, Iowa

[73] Assignee: Deere & Company, Moline, Ill.

[21] Appl. No.: 855,658

[22] Filed: Apr. 25, 1986

[51] Int. Cl.$^4$ .............................................. B02C 18/22
[52] U.S. Cl. .................................. 241/101.7; 56/13.3; 241/222; 406/100
[58] Field of Search ................. 198/641, 642; 406/57, 406/100; 241/101.7, 60, 222, 56, 101.5; 56/13.3, 13.4, 13.9, 14.3

[56] References Cited

U.S. PATENT DOCUMENTS

| | | | |
|---|---|---|---|
| 3,732,672 | 5/1973 | Adee et al. | 56/13.3 |
| 3,805,660 | 4/1974 | Burrough | 241/222 X |
| 4,592,514 | 6/1986 | John et al. | 241/222 X |

OTHER PUBLICATIONS

European Patent Application, 32601, 7-1981.

Primary Examiner—Mark Rosenbaum

[57] ABSTRACT

A forage harvester blower includes a blower fan having a plurality of pivotable blades which operate closely to a cylindrical surface of the blower housing. Forge is delivered into the blower housing along a path extending tangentially to an outer part of the blades and exits the housing at a location spaced approximately ninety degrees from the entrance point.

5 Claims, 7 Drawing Figures

FORAGE HARVESTER BLOWER

BACKGROUND OF THE INVENTION

The present invention relates to forage harvesters and more particularly relates to a blower or impeller arrangement for receiving and delivering chopped forage.

It is well-known in forage harvesters to provide a blower or impeller for receiving chopped forage either directly from the cutterhead or from kernel processing rolls or an impeller or other forage moving apparatus located between the cutterhead and blower and for delivering the chopped forage to a forage collecting container such as the box of a wagon or truck, for example. In an attempt to minimize plugging, designers have advantageously located the blower so as to receive the chopped forage in a relatively thin mat flowing along the outer periphery of the cylindrical blower housing where the forage is engaged and accelerated upwardly by blades or paddles extending radially from the blower rotor. It has been found, however, that when relatively heavy slugs of forage enter the blower that some forage may be carried around by the rotor or some may through centrifugal force be tightly frictionally engaged with the blower housing wall or may even become wedged between the outer edges of the blades or paddles and the blower housing wall resulting in a large amount of energy being required to impel the crop.

SUMMARY OF THE INVENTION

According to the present invention, there is provided an improved forage harvester blower and more specifically there is provided an improved blade mounting for a fan of such a blower.

A broad object of the invention is to provide a blower having good throwing distance with reduced power requirements.

More specifically it is an object of the invention to situate a blower housing so that forage enters approximately tangentially to the housing outer diameter, follows the blower housing periphery through an arc of about ninety degrees and exits approximately tangentially to the housing outer diameter.

A further object is to provide a blower which is situated as set forth in the immediately preceding object and which has fan blades mounted for pivoting about respective axes extending parallel to the fan axis whereby the fan blades may pivot back to prevent wedging and to assure that forage is discharged uniformly up the chute without any tendency to be carried around the blower housing.

These and other objects will become apparent from a reading of the ensuing description together with the appended drawings.

DESCRIPTION OF THE PREFERRED EMBODIMENT

Figure 1:
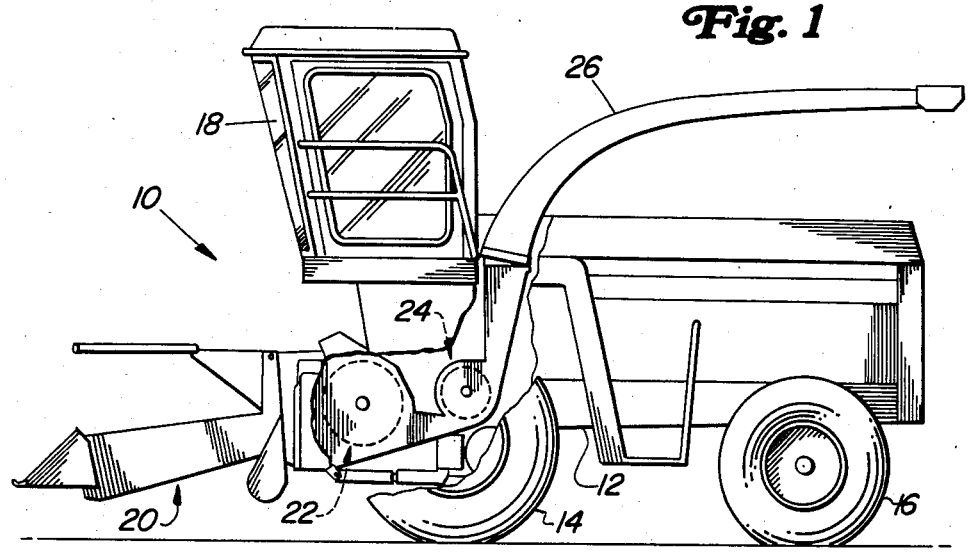
FIG. 1 is a somewhat schematic, left side elevational view of a self-propelled forage harvester embodying a blower constructed in accordance with the present invention, with parts broken away to reveal the blower.
Figure 2:
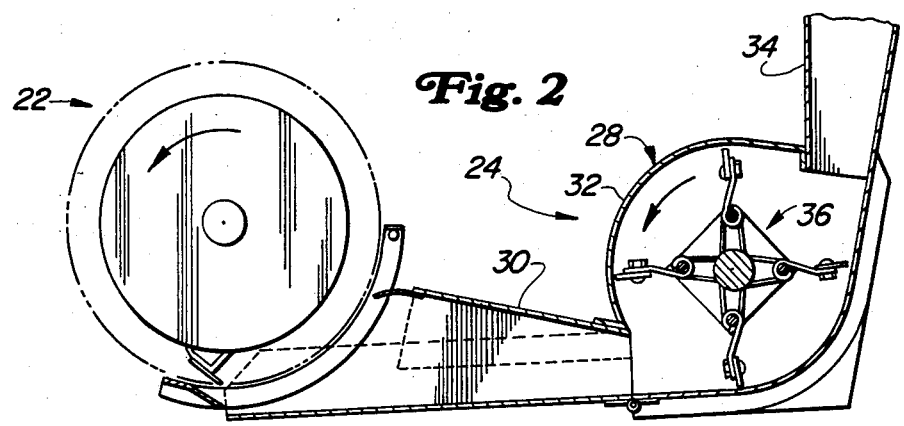
FIG. 2 is a vertical sectional view of the blower.
Figure 3:
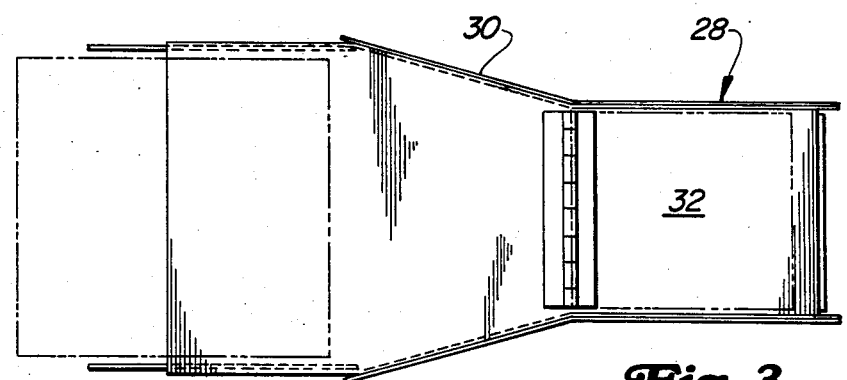
FIG. 3 is a bottom view of the blower shown in FIG. 2.
Figure 5:
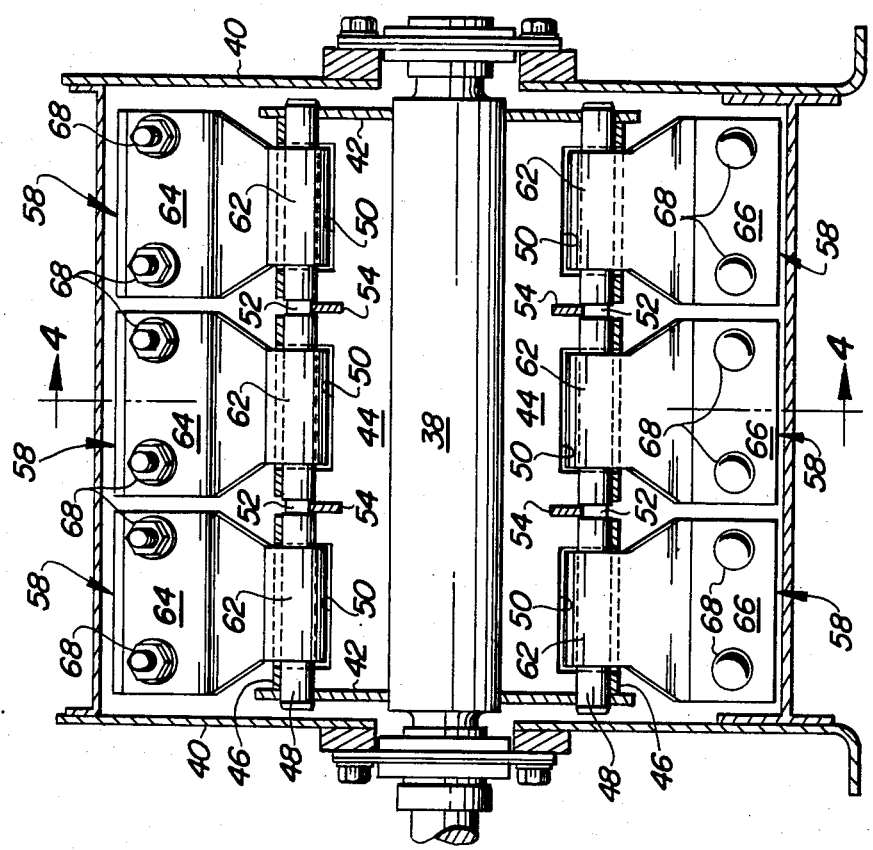
FIG. 5 is a vertical sectional view taken longitudinally through the blower rotor but with the blades being shown in full line for clarity.
Figure 4:
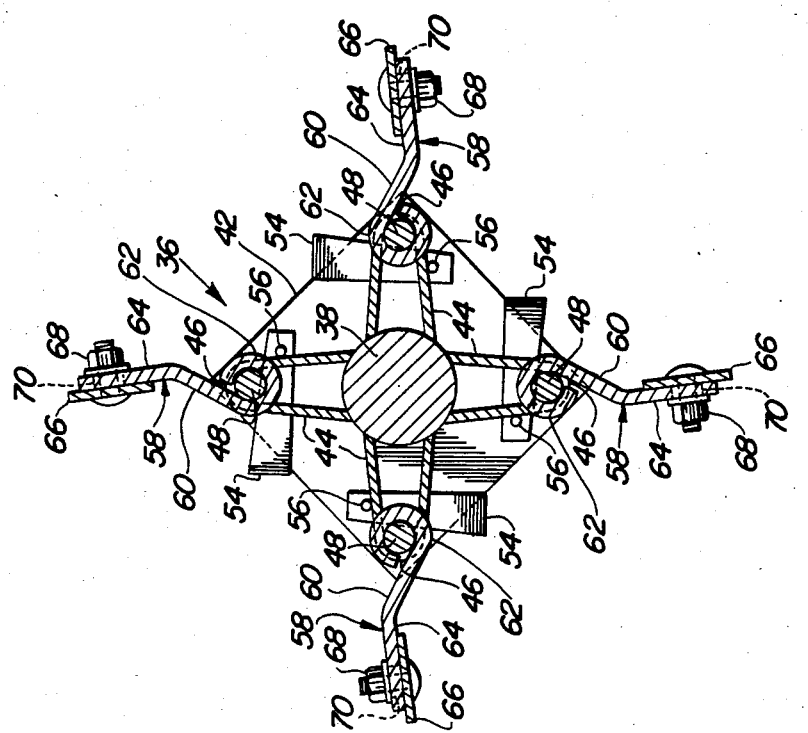
FIG. 4 is a sectional view taken along line 4—4 of FIG. 5.

Referring now to FIG. 1, there is shown a self-propelled forage harvester 10 which embodies the present invention, it being noted that the principles of the present invention could be applied to towed forage harvesters as well.

The forage harvester 10 includes a main frame 12 supported on front and rear pairs of wheels 14 and 16, of which only one of each pair is shown. Located at an upper forward location on the frame 12 is an operator's cab 18 which contains all of the controls (not shown) for the harvester. Mounted to the forward end of the frame 12 is a row crop harvesting head 20 which is provided for severing a crop, such as corn or the like, from the ground and directing it to be chopped into forage by knives (not shown) of a transverse cylinder type cutterhead 22. Chopped forage is delivered rearwardly by the cutterhead 22 to an impeller or blower assembly 24 which, in turn, delivers the chopped forage upwardly into, and creates an airstream for expelling it through, a rearwardly extending discharge conduit or spout 26.

The blower assembly 24 (FIGS. 2-5) includes a housing 28 having an inlet section 30 extending rearwardly and upwardly from a lower right quadrant of the cutterhead 22, as viewed in FIG. 1, to a lower bottom quadrant of a cylindrical section 32, and an outlet section 34 extending upwardly between an upper rear quadrant of the cylindrical section 32 and an entrance to the discharge spout 26. Located within the cylindrical section 32 of the housing is a blower impeller 36 including a transverse shaft 38 extending through and being journalled in opposite end walls 40 of the housing cylindrical section 32. A pair of generally square end plates 42 is centered on and fixed to the shaft 38 at respective locations adjacent inner faces of the walls 40. The respective corners of the plates 42 are axially aligned with each other. Extending between the end plates and having opposite ends welded to the plates are four radially extending stiffener members 44 which are of U-shaped cross section with diametrically opposite pairs thereof being respectively arranged symmetrically relative to radial planes passing through the corners of the end plates. Bight portions 46 of the stiffener members 44 are respectively located adjacent the four corners of the end plates while the legs of the members 44 are welded to the shaft 38. Four impeller blade or paddle mounting rods 48 are respectively received in the bight portions 46 and each has its opposite ends respectively received in holes provided in the pair of end plates 42. The bight portion 46 of each stiffener member 44 is provided with three evenly spaced notches or cutouts 50. The mounting rods 48 are each provided with a pair of circumferential grooves 52 respectively located halfway between the middle and end notches 50 and received in each groove is one edge of a wedge key 54 which is received in aligned rectangular openings provided in the legs of the associated stiffener member 44. A keeper pin 56 is releasably received in a hole provided in each key 54 so as to retain the keys in place for preventing endwise movement of the associated rod. Pivotally mounted on each rod 48 in the respective areas thereof which pass through the notches 50 are three paddles or blades 58. The paddles 58 each include an inner mounting or base section 60 formed by a plate having an inner end bent to form a cylinder 62 which is pivotally received on the associated rod. The cylinder 62 is narrower than the remainder of the mounting portion which widens to an outer, generally rectangular mounting section 64. A replaceable paddle end section 66 is fastened to the mounting section 64 by a pair of bolt, washer and nut assemblies 68 arranged with the bolts extending through slotted openings 70 provided in the mounting section 64. The openings 70 permit the end section 66 to be adjusted outwardly to establish a desired relatively close clearance between the blower impeller paddles and the cylindrical section 32 of the blower housing.

The position of the blower assembly 24 relative to the cutterhead 22 and discharge spout 26 together with the pivoted impeller paddles 58 is thought to result in a structure for efficiently conveying crop from the cutterhead to a forage collection container. Specifically, as viewed in FIG. 1, forage leaving the cutterhead 22 is fed directly into the periphery of the blower housing 28, at it lower front quadrant, approximately tangential to the outer diameter of the blower impeller 36 and in the same direction of movement as that of the impeller paddles or blades 58. Each paddle 58 collects the crop at its outer end as it moves the crop along the blower housing periphery to and then discharges it uniformly up into and through the spout 26. The impact of the impeller blades 58 against the incoming crop is minimized because they have approximately the same direction of movement and thus the energy required to impel the crop is reduced. Also, while the crop is being transported along the periphery of the housing 28, the blades 58 may pivot back to prevent wedging, thereby reducing the energy required. Furthermore, as the amount of crop increases on a given blade 58, it will pivot back to somewhat balance the centrifugal force on the blade and reduce the force caused by friction of the crop on the blower housing. This rearward pivoting of the blades 58 assures that all crop is discharged at a uniform direction up the chute without any tendency to carry around the housing. Consequently, the impeller 36 has a good throwing distance with reduced power requirements.

Figure 6:
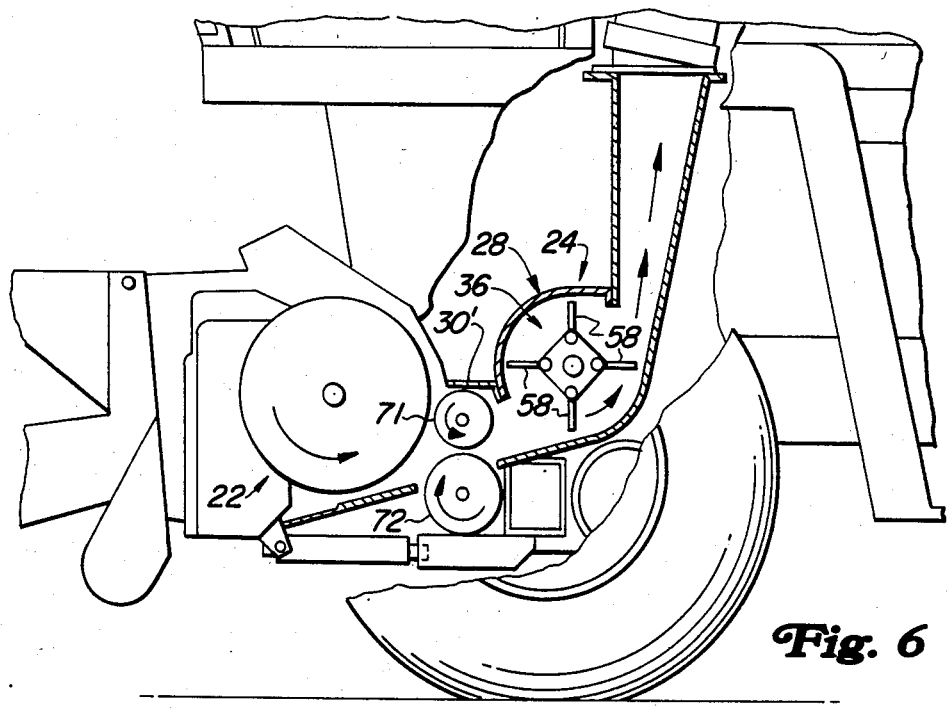
FIG. 6 is a left side view with portions broken away showing a first variant wherein crushing rolls are installed between the cutterhead and the impeller.

Should it be desired to condition the chopped forage exiting the cutterhead 22, upper and lower counterrotating crusher rolls 71 and 72, respectively, may be installed within an inlet section 30' of the impeller or blower housing 28, as shown in FIG. 6. The bite of the rolls 71 and 72 is disposed so as to be in the tangential flight of the crop as it leaves the cutterhead 22 so as to deliver the crop into the housing 28 without altering its flight path.

Figure 7:
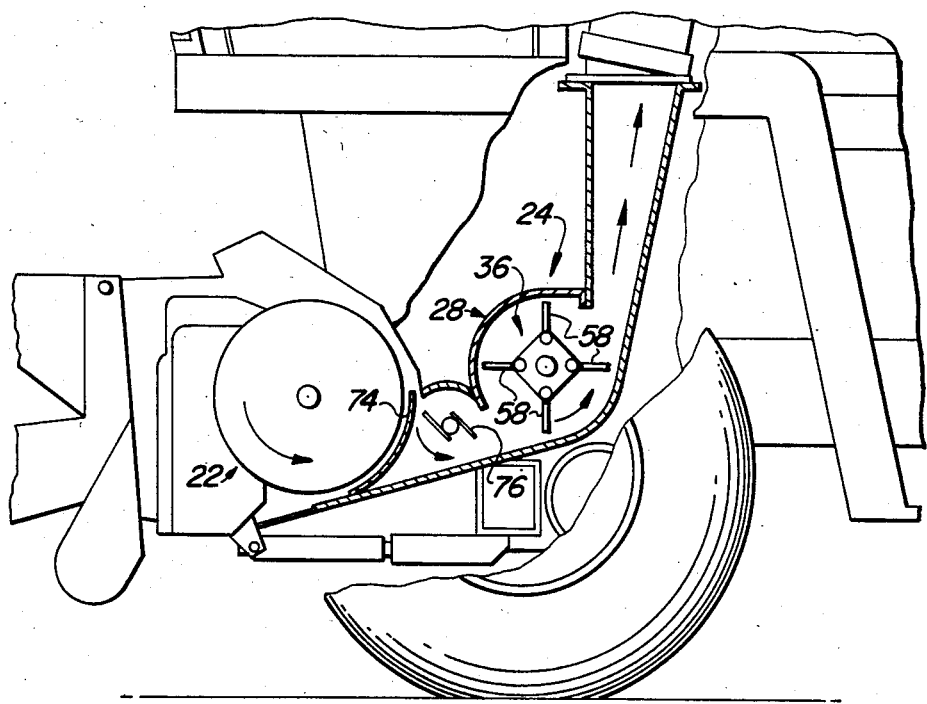
FIG. 7 is a left side view with portions broken away showing a second variant wherein a recutter screen and an auxiliary impeller are installed between the cutterhead and the main impeller.

If it is desired to produce finely chopped forage, the arrangement shown in FIG. 7 may be used where an arcuate recutter screen 74 is mounted adjacent the lower rear quadrant of the cutterhead 22 and an auxiliary impeller 76 is located in an inlet section 30" of the blower housing 28 for delivering the finely chopped crop tangentially into the periphery of the impeller blades 58.

Thus, the variants shown in FIGS. 6 and 7 preserve the desired efficient flow of crop material from the cutterhead 22 and through the impeller or blower assembly 24 by continuing the tangential flight path of material leaving the cutterhead such that it enters the impeller 36 tangentially to the outer portions of the blades 58.

We claim:

1. In a forage harvester including an impeller housing including a section arranged cylindrically about a horizontal axis and containing an impeller having a rotor mounted for rotation about said axis and including a plurality of radially extending blades having outer ends which trace a cylindrical path spaced closely to said housing section, an inlet duct extending fore-and-aft substantially tangentially into a lower forward quadrant of said housing, an outlet duct extending upwardly substantially tangentially out from an upper rear quadrant of said housing, and a rotary crop handling apparatus mounted for delivering crop tangentially into an outer portion of the blades, the improvement comprising: said rotor includes a shaft having a pair of radially extending plates fixed thereto at axially spaced locations; a plurality of equiangularly spaced uniform diameter, straight rods arranged parallel to said shaft and being axially shiftably received in said pair of plates for permitting their selective removal therefrom; releasable securing means for preventing axial movement of each rod relative to the pair of plates and at least one blade being pivotally mounted on each rod.

2. The forage harvester defined in claim 1 wherein at least two blades are mounted on each rod and further including a stiffener member associated with each rod and extending between and having opposite ends fixed to the pair of plates; each stiffener member being U-shaped in cross section and respectively being arranged symmetrically relative to a radial plane passing through an associated rod and with a bight portion of each stiffener member being received about a radially outer periphery of the associated rod and being cut out and receiving and maintaining in axially spaced relationship the blades mounted on the associated rod; each rod having at least one recess extending in a direction crosswise to the length of the rod; and said securing means including a wedge key extending through each stiffener member inwardly of the rod associated with the stiffener and received in said recess.

3. The forage harvester defined in claim 1 wherein each blade is provided with a radially adjustable outer end section.

4. The forage harvester defined in claim 1 wherein said pair of plates are square and have corners axially aligned with each other; said shaft passing centrally through said plates; and said plurality of rods being four rods respectively located in the plates adjacent the axially aligned corners thereof.

5. The forage harvester defined in claim 1 and further including a stiffener member associated with each rod and extending between and having opposite ends fixed to the pair of plates; said stiffener members being U-shaped in cross section and respectively being arranged symmetrically relative to a radial plane passing through an associated rod and with a bight portion of each stiffener member being received about a radially outer periphery of the associated rod; each rod having at least one recess extending in a direction crosswise to the length of the rod; and said securing means including a wedge key extending through each stiffener member inwardly of the rod associated with the stiffener and received in said recess.

* * * * *